United States Patent [19]

Carpenter et al.

[11] Patent Number: 5,004,099
[45] Date of Patent: Apr. 2, 1991

[54] PAPER ITEM RECEPTACLE

[76] Inventors: Dewey Carpenter, 5780 SW. 14th St., Plantation, Fla. 33317; Kathryn Ehster, 925 Crowsnest Cir., #36, Orlando, Fla. 32825

[21] Appl. No.: 402,679

[22] Filed: Sep. 5, 1989

[51] Int. Cl.$^5$ ............................................. B65B 13/02
[52] U.S. Cl. .................................... 206/83.5; 100/34; 100/912; 206/442
[58] Field of Search .................. 229/125.01; 206/442, 206/83.5; 100/34, 912; D6/475

[56] References Cited

U.S. PATENT DOCUMENTS

| 2,364,518 | 12/1944 | Clouser | 100/34 |
| 2,744,461 | 5/1956 | Genco | 100/34 |
| 3,912,047 | 10/1975 | Chun et al. | 100/34 |
| 4,150,612 | 4/1979 | Kessler | 100/34 |

FOREIGN PATENT DOCUMENTS

| 2400346 | 4/1979 | France | 206/83.5 |
| 2738468 | 3/1979 | Sweden | 100/34 |
| 611219 | 5/1979 | Switzerland | 100/34 |

Primary Examiner—Gary E. Elkins
Attorney, Agent, or Firm—Malin, Haley, McHale, DiMaggio & Crosby

[57] ABSTRACT

A novel reusable container in combination with tie rope securement means comprised of a rectangular box or receptacle defining a pair of generally V-shaped cutouts in first and second adjacent vertical side walls and tie rope dispensing means associated with the third and fourth vertical side walls of said rectangular receptacle. One or more tie ropes of suitable length are dispensed from said dispensing means and draped across the bottom of the receptacle and oriented such that the free ends of said ropes protrude through the V-shaped cutouts. Newspapers are then stacked on top of the tie rope until the height of the stack reaches the upper edge of the container or any other desired height. The free ends of the tie ropes or the like are then tensioned tightly around the bundle and twisted or knotted securely about one another such that a uniform bundle is formed. The bundle may then be removed from the container and transported to a recycling collection site or stored without risk of the securement means becoming loose or broken. The now empty cardboard container is then available for similarly collecting another set of newspapers. The pair of tie ropes are dispensed and oriented at right angles to each other across the bottom panel of the receptacle across the length dimension and the width dimension, respectively, with the free ends thereof disposed through said cutouts during stacking.

3 Claims, 3 Drawing Sheets

PAPER ITEM RECEPTACLE

BACKGROUND OF THE INVENTION

1. Field of the Invention

The present invention relates generally to paper storage and baling or bundling devices and more particularly to a paper storage and recycling container for newspapers and other recyclable paper products consisting of a reusable storage box equipped with tie ropes or the like to secure papers in a bundle type arrangement.

2. Prior Art

The recycling of newspapers and other paper items has become important in the conservation effort. However, when one attempts to save newspapers for an extended period of time for recycling, the problem of storage space and organization arises. The accumulation of more than a few days, newspapers creates an unsightly, disorganized array if the papers are merely allowed to pile up.

In the past, people have attempted to remedy this problem by binding a sizable stack of old papers with rope or twine wherein the rope or twine is tied taut around the bundle thereby compressing the stack and creating a more uniform bundle configuration which can be stacked on similarly formed bundles for storage or transport. However, when attempting to bundle stacks of newspapers one must consistently keep a supply of rope or twine in convenient access and furthermore one must monitor the accumulated stack of newspapers to determine when there is a sufficient quantity of newspapers to be contained in a single bundle. Additionally, the problem frequently arises wherein the securement of the rope or twine around the bundle becomes loosened or broken over time and with handling, thereby creating the possibility of individual newspapers sliding out of the bundle configuration causing disorganization. One must then reconfigure the bundle and locate a second length of rope or twine for securement. This has become a burden and a source of frustration for the individual involved in recycling newspapers.

Therefore, there exists a need in the art for a paper storage and baling device which facilitates convenient storage of paper items such as newspaper and the like and additionally includes a built-in reliable means for securing the same into bales or bundles once a sufficient quantity has accumulated.

Further, most papers are secured with non-degradable twine or rope, which interferes with the recycling process to the point where such process becomes unable to be performed.

SUMMARY OF THE INVENTION

The present invention provides a novel reusable container in combination with tie rope securement means which is easy to use, economical to manufacture, and exceedingly well adapted to overcome the existing problems of the art.

The present invention generally comprises a cardboard box or receptacle defining one or more generally V-shaped cutouts disposed in the vertical side walls of said box. One or more tie ropes are draped across the bottom of the box and are oriented such that the free ends of the rope protrude through the V-shaped cutouts. Newspapers are then stacked on top of the tie rope until the height of the stack reaches the upper edge of the container or any other desired height. The free ends of the tie ropes or the like are then tensioned tightly around the bundle and twisted or knotted securely about one another such that a uniform bundle is formed. The bundle may then be removed from the container and transported to a recycling collection site or stored without risk of the securement means becoming loose or broken. The now empty cardboard container is then available for similarly collecting another set of newspapers. A pair of tie ropes may be oriented at right angles to each other across the bottom panel of the box across the length dimension and the width dimension with the free ends thereof disposed through said cutouts.

At least two alternative embodiments are contemplated. Either may be provided with a tie rope dispenser integrally associated with a side and/or end panel thereof.

A first embodiment comprises a sturdy, open-top rectangular receptacle having four upstanding vertical side walls and a horizontal bottom panel. Across the bottom is placed a length of tie rope. Each said side wall defines a V-shaped cutout therein extending from the uppermost edge thereof to generally the bottom thereof, adapted as a relief means through which the end portions of said tie rope may be laid while the receptacle is being filled with paper items to be recycled. Once the receptacle is filled, the tie rope ends may be raised up over the top of the stack of paper items and secured thereabout. The bundle of paper items thus secured is ready for transport to a recycling facility. To begin another bundling operation, a new length of tie rope is laid across the bottom of the receptacle, preferably both lengthwise and widthwise, with the ends thereof overlapping the bottom area of the V-shaped cutouts.

A second, alternative, embodiment is contemplated wherein the receptacle is as previously set forth but where the V-shaped cutout is truncated at its top, creating a grab bar or handle means.

It is therefore an important object of the present invention to provide a self-contained and reusable device for the storage and baling of newspapers for the purpose of recycling.

It is another object of the present invention to provide a stacking and securement means for bundling recyclable paper items such that ease in collection, handling, storage, and transport of the bundles is readily achieved.

A further object comprises the provision of a selfcontained device for collection and binding of newspapers for recycling purposes wherein the aforementioned existing problems of the prior art are minimized or eliminated.

A still further object comprises providing a newspaper storage and baling container which is easy to use, economical to manufacture, and well adapted for its intended use.

It is a still further object of the present invention to provide a paper item collection receptacle having a relief means associated therewith for conveniently locating tie rope ends free and unencumbered for subsequent tying.

Other objects and advantages will become apparent from the following description taken in connection with the accompanying drawings.

DETAILED DESCRIPTION OF PREFERRED EMBODIMENT

Figure 1:
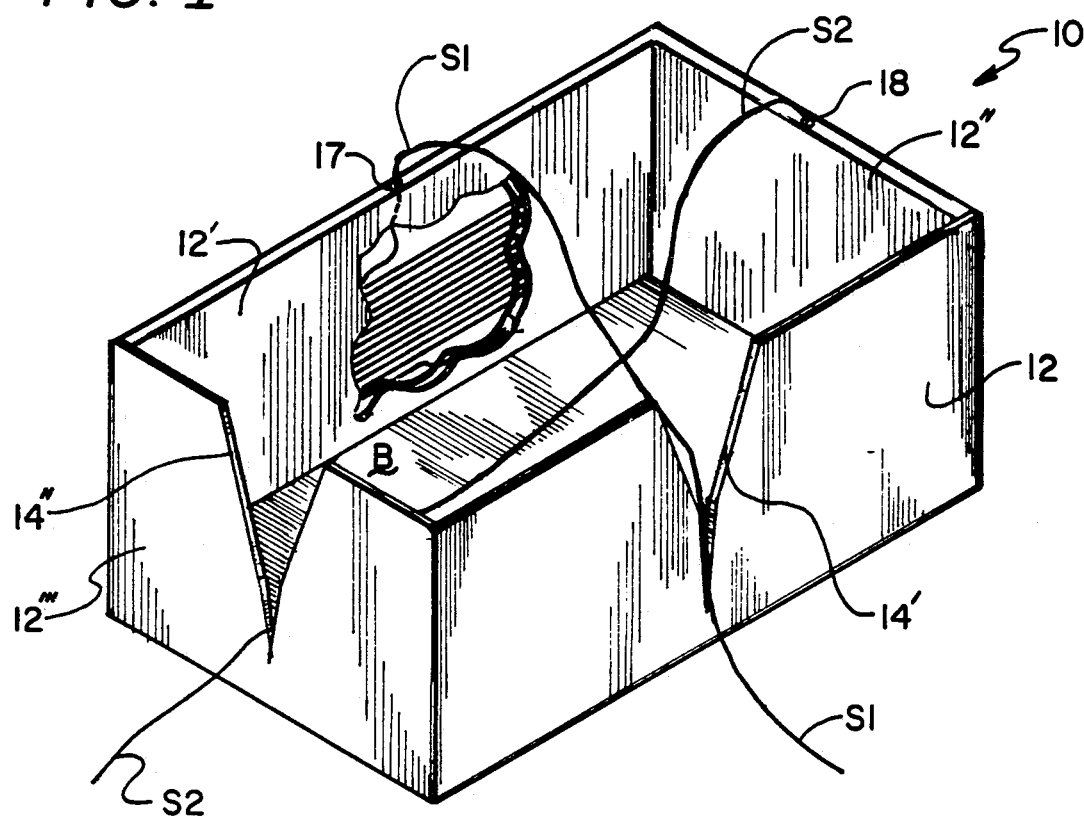
FIG. 1 is a perspective view of the paper item receptacle of the instant invention, showing interior detail in partial relief.

Referring now to the drawings, reference numeral 10 designates the paper item receptacle of the instant invention which has for its primary purpose the means for accumulating and securing paper items to be recycled. The invention is comprised generally of a rectangular, open-top receptacle 10 having four generally vertically upstanding rigid side walls or panels 12, 12', 12" and 12"' and a horizontal bottom, said bottom indicated by the reference letter B.

Figure 3:
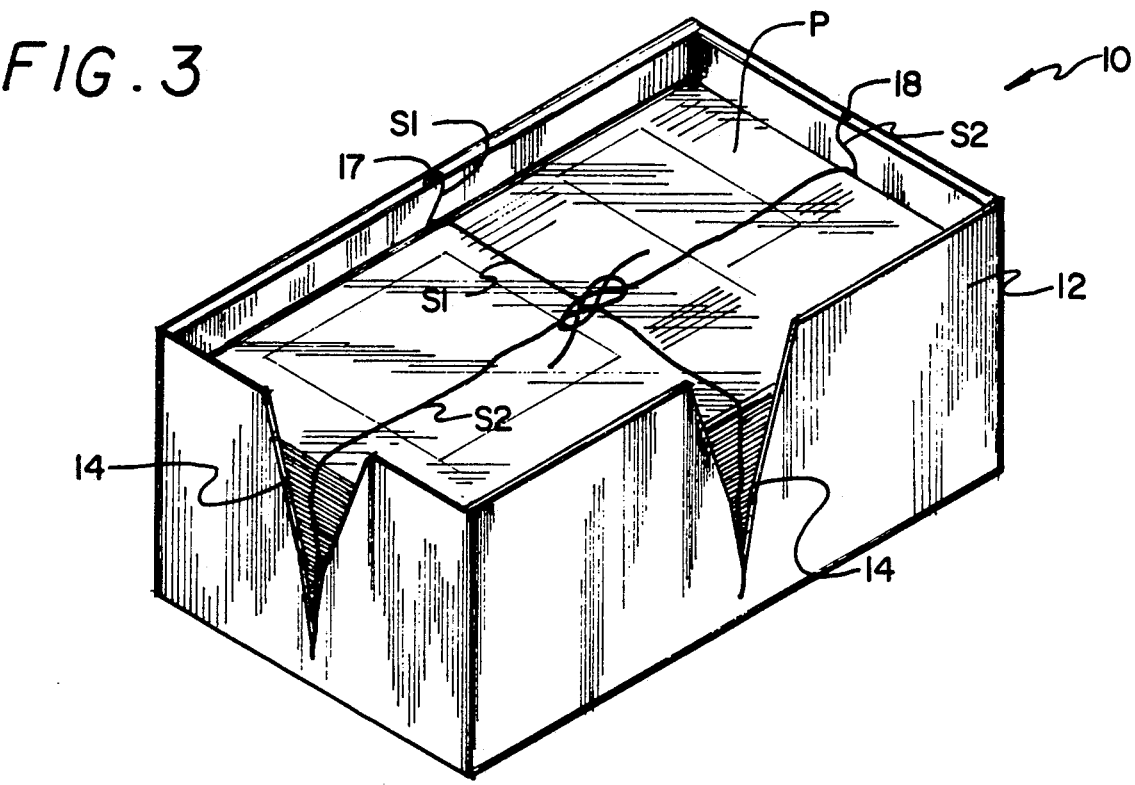
FIG. 3 shows the paper item receptacle including paper items contained therein for recycling.
Figure 4:
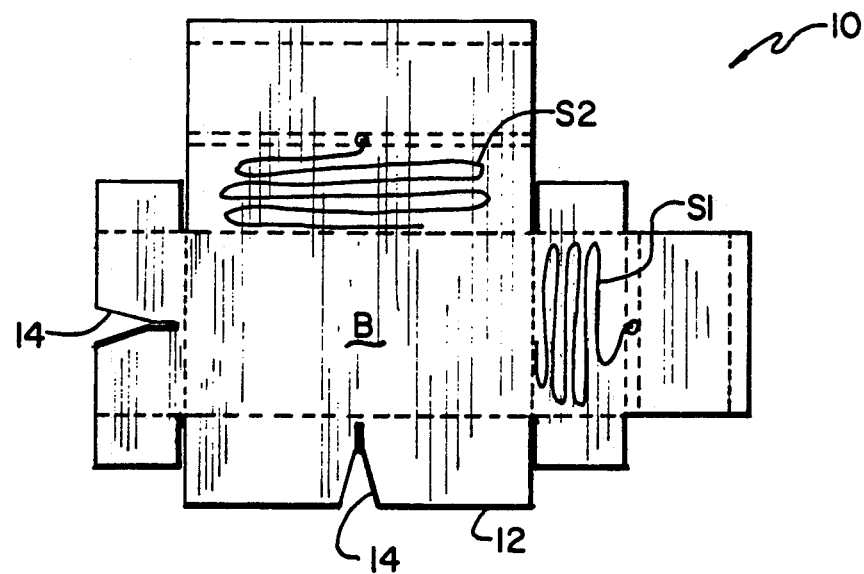
FIG. 4 shows the receptacle of FIG. 1 in unfolded form.

At least two of the vertical sides define the generally V-shaped cutout means 14 adapted to hold the free ends of tie rope S1 and S2 and to thereby allow the freedom of the user to draw the free ends of said tie rope S1, S2 up around the bundle of stacked paper items to be recycled, designated by the reference letter P in FIG. 3, when the stack reaches a desired height.

As shown in relief in FIG. 1, a continuous length of tie wire S1, S2 may be disposed within adjacent vertical side walls of receptacle 10 and dispensed through apertures 17, 18, respectively, at the upper end of said adjacent side walls. This allows the user to simply withdraw a desired length of tie rope S1, S2, from the interior of said side walls and to lay the free ends thereof through cutouts 14 and thereafter begin to lay discarded paper items thereupon. As seen in FIG. 3, once the stack of paper items to be recycled reaches the desired height, the free ends of tie ropes S1, S2 are drawn up and knotted or otherwise connected together.

Figure 2:
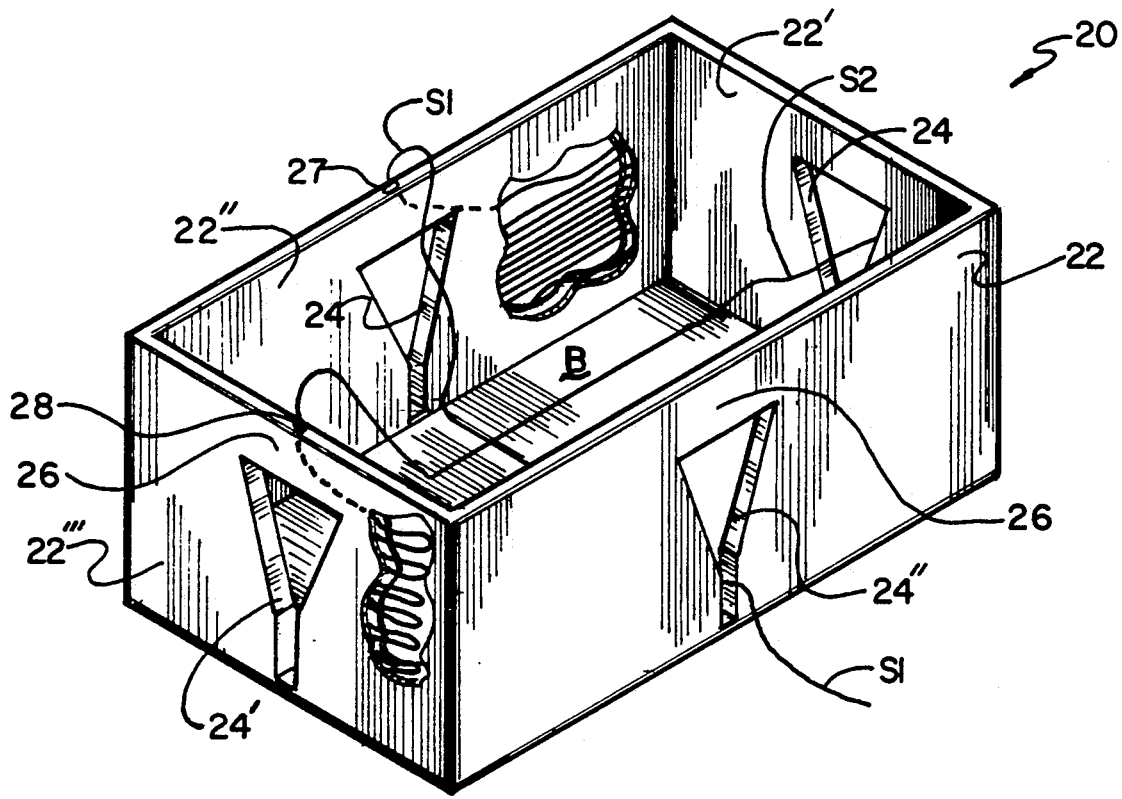
FIG. 2 is a perspective view of a second embodiment of the paper item receptacle of the instant invention.

An alternative embodiment is shown in FIG. 2 and indicated by the reference numeral 20. Therein, a rectangular, open-top receptacle 20, similar to receptacle 10 of FIG. 1, is disclosed having four generally vertical adjoining side walls or panels, said side walls defining V-shaped cutouts 24, 24', 24" and 24"' adapted to receive the free ends of tie rope S1, S2. In operation, paper items to be stacked, tied together, and sent for recycling are placed atop tie ropes S1, S2 in receptacle 20. The free ends of tie ropes S1, S2 are drawn up and tied together once said stack reaches a predetermined height. Naturally, the length of tie rope S1, S2 emanating from apertures 27, 28 respectively, are severed prior to their ends being tied together. After removal of a tied bundle of paper items P, a new length of tie rope S1, S2 will be drawn from within the interior of side panels 22' and 22", the free ends thereof being passed through opposing cutouts 24', 24", respectively.

As best seen in the relief portion of FIG. 2 in side wall 22', a continuous length of tie rope may be stored within the interior of side wall 22'. This added convenience feature allows the user to be free from worry regarding tie rope S1, S2 during repeated stacking operations over time.

Figure 5:
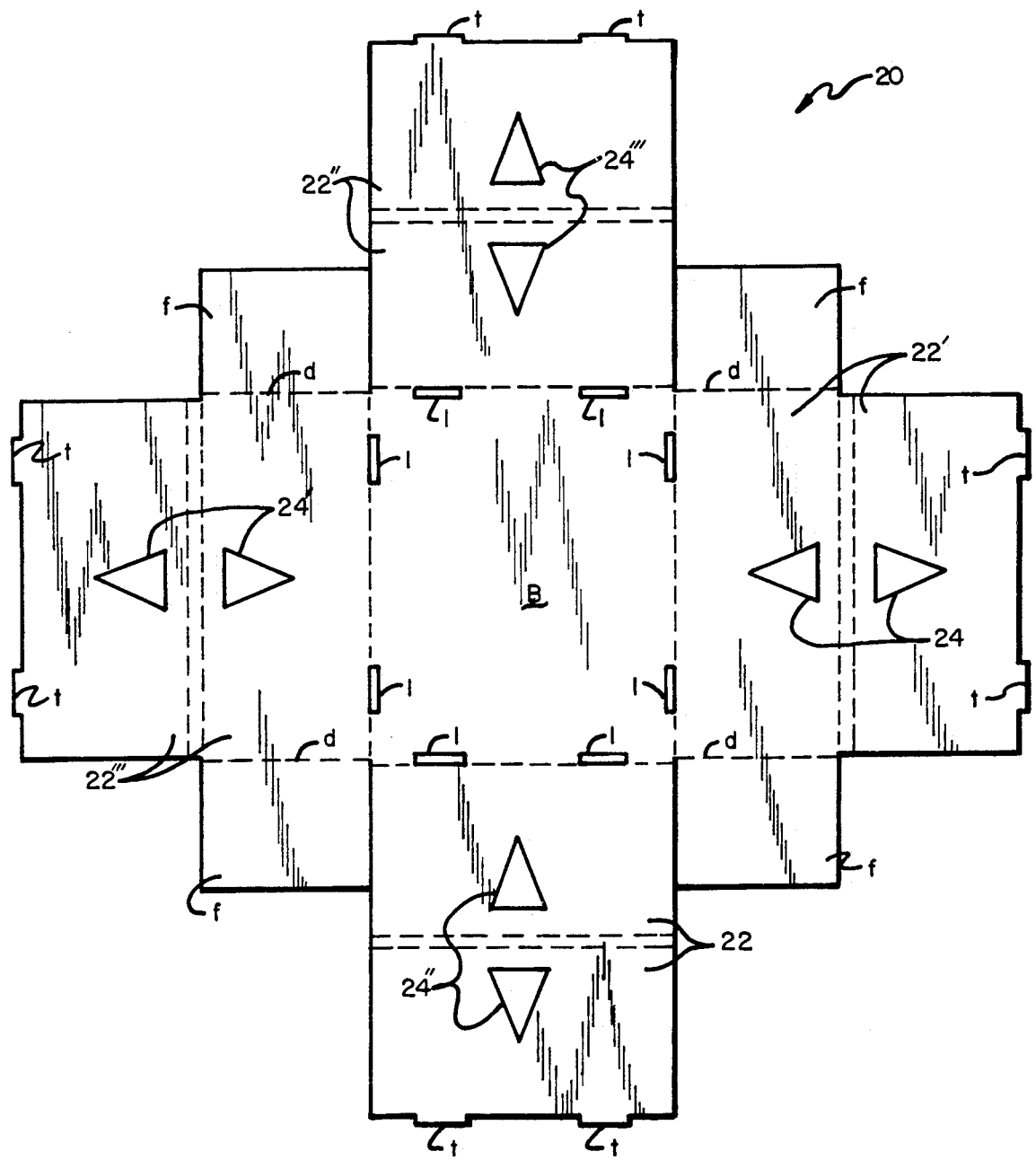
FIG. 5 shows the receptacle of FIG. 2 in unfolded form.

As best seen in FIG. 5, receptacle 22 is comprised of a horizontal bottom B and four bi-fold side panels 22, 22', 22", 22"'. To construct receptacle 20, flaps f are folded along dashed line d of FIG. 5 and bi-fold sides 22' and 22"' folded upon themselves and tabs t inserted into slots 1. In like fashion, sides 22 and 22" are folded upon themselves and tab t inserted into slots 1. In this way, the side walls define a hollow volume at their interior suitable for holding a continuous length of tie rope or a replaceable tie rope dispenser means (not shown). Further, a substantial amount of rigidity is imparted to the receptacle 20 by virtue of the double panelled side walls as described herein.

Tie rope S1, S2 is preferably fabricated of paper or other material wholly compatible with the paper recycling process and the chemicals and other materials used therein. Alternatively, the tie rope S1, S2 may be made of a plastic or metallized material.

Further, receptacle 10 or 20 is preferably constructed of either corrugated cardboard or plastic, dependant upon cost and strength requirements.

The instant invention has been shown and described herein in what is considered to be the most practical and preferred embodiment. It is recognized, however, that departures may be made therefrom within the scope of the invention and that obvious modifications will occur to a person skilled in the art.

What is claimed is:

1. A paper item storage receptacle adapted to receive a stack of paper items to be recycled, comprising:
   a generally rectangular, open-top container having four vertical adjoining side walls and a bottom horizontal panel connected therebetween;
   wherein each of two of said side walls define a generally V-shaped cutout therein;
   at least one segment of tie string having free ends is disposed within at least one of said V-shaped cutouts and draped across the bottom panel of said receptacle, said segment of tie string adapted to secure the stack of paper items in a secured bundle once the free ends of said segment of tie string are connected together;
   wherein the V-shaped notches are truncated by handle means for holding said receptacle.

2. The paper item storage receptacle of claim 1, wherein at least one of said side panels defines a hollow rectangular volume therewithin for housing a plurality of lengths of said tie rope to be utilized in bundling stacks of paper items to be recycled, said at least one said side panel further defining an aperture means for dispensing said plurality of lengths of said tie rope.

3. A paper item storage receptacle adapted to receive a stack of paper items to be recycled, comprising:
   a generally rectangular open top container having first, second, third and fourth vertical adjoining side walls and a bottom horizontal panel connected therebetween;
   wherein each of said first and second side walls define a generally V-shaped cutout therein;
   said V-shaped cutout adapted to receive at least one segment of tie string, said tie string having free ends adapted to be disposed within at least one of said V-shaped cutouts and draped across the bottom panel of said receptacle, said segment of tie string adapted to secure the stack of paper items in a secured bundle once the free ends of said segment of tie string are connected together;

wherein each said V-shaped notch is open at its upper end;
wherein each of said third and fourth side walls define a hollow rectangular volume therewithin for housing a plurality of segments of said tie string to be utilized in bundling stacks of paper items to be recycled, each of said third and fourth side walls further defining an aperture means for dispensing said plurality of segments of said tie string therethrough.

* * * * *